(12) United States Patent
Zierolf

(10) Patent No.: US 7,104,616 B2
(45) Date of Patent: Sep. 12, 2006

(54) BRAKE GAIN-BASED TORQUE CONTROLLER

(75) Inventor: Michael Lee Zierolf, Vandalia, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/613,057

(22) Filed: Jul. 2, 2003

(65) Prior Publication Data

US 2005/0001474 A1   Jan. 6, 2005

(51) Int. Cl.
*B60T 8/60* (2006.01)
(52) U.S. Cl. .......... 303/150; 188/181 T; 303/112
(58) Field of Classification Search ........ 303/112, 303/122, 152, 169
See application file for complete search history.

(56) References Cited

U.S. PATENT DOCUMENTS

| | | | | |
|---|---|---|---|---|
| 4,412,291 A | * | 10/1983 | Amberg et al. | 701/78 |
| 4,822,113 A | * | 4/1989 | Amberg et al. | 303/191 |
| 5,050,940 A | * | 9/1991 | Bedford et al. | 303/166 |
| 5,233,528 A | * | 8/1993 | Phipps et al. | 701/79 |
| 5,381,337 A | * | 1/1995 | Burgess | 701/78 |
| 5,390,990 A | * | 2/1995 | Cook et al. | 303/132 |
| 5,539,641 A | * | 7/1996 | Littlejohn | 701/70 |
| 5,762,407 A | | 6/1998 | Stacey et al. | 303/155 |
| 5,767,648 A | | 6/1998 | Morel et al. | 318/568 |
| 6,036,285 A | * | 3/2000 | Murphy | 303/112 |
| 6,220,676 B1 | * | 4/2001 | Rudd, III | 303/150 |
| 6,607,253 B1 | * | 8/2003 | Yamamoto et al. | 303/112 |
| 6,722,745 B1 | * | 4/2004 | Salamat et al. | 303/126 |
| 6,752,353 B1 | * | 6/2004 | Park | 244/111 |

FOREIGN PATENT DOCUMENTS

| | | |
|---|---|---|
| EP | 0 927 671 | 7/1999 |
| FR | 2 396 675 A | 2/1979 |
| WO | 03/104057 A | 12/2003 |

OTHER PUBLICATIONS

U.S. Appl. No. 10/153,513; Filing Date: May 22, 2002, Michael Lee Zierolf, Improved Wheel Deceleration-Based Antiskid Brake Controller With Adaptive Deceleration Threshold.
International Search Report for corresponding Application No. PCT/US2004/021384 mailed Nov. 16, 2004.

* cited by examiner

*Primary Examiner*—Christopher P. Schwartz
(74) *Attorney, Agent, or Firm*—Renner, Otto, Boisselle & Sklar, LLP

(57) ABSTRACT

A brake gain based torque controller utilizes commanded torque, measured torque and measured pressure in order to provide brake control for a vehicle, such as an aircraft. According to one particular aspect of the invention, the brake gain-based torque controller is provided for controlling a braking operation of a wheel of a vehicle based on a computed brake gain calculated in real-time. Under normal breaking conditions, command torque is multiplied by the calculated computed brake gain to produce a pressure signal to control the pressure to be applied to the brake.

16 Claims, 9 Drawing Sheets

PRIOR ART — PID Controller

Brake Gain Controller

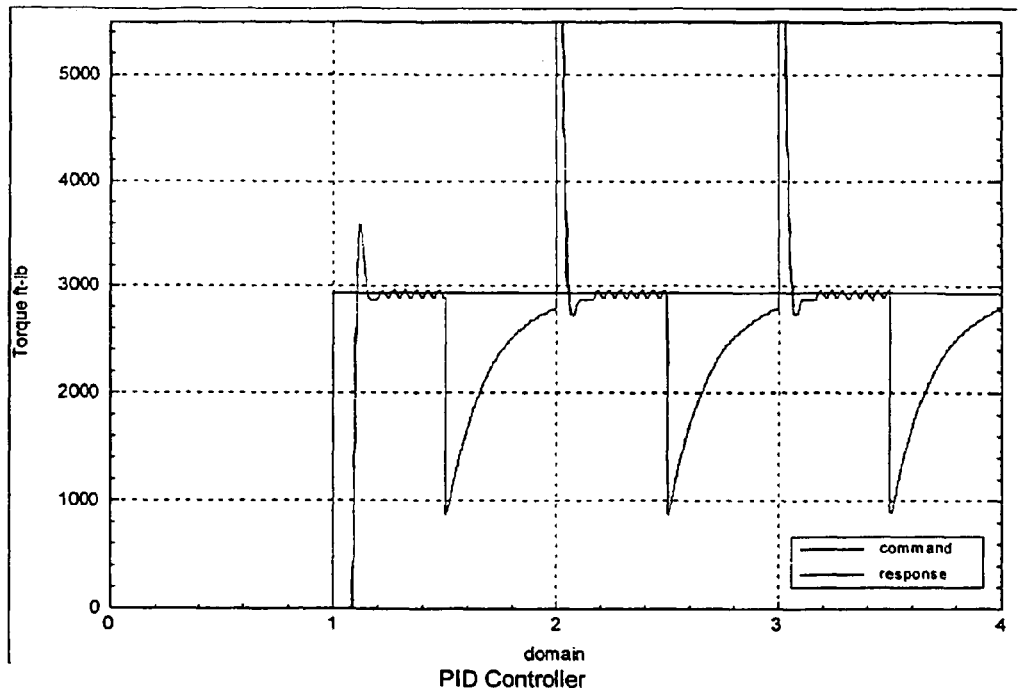
PRIOR ART  PID Controller  FIG. 7
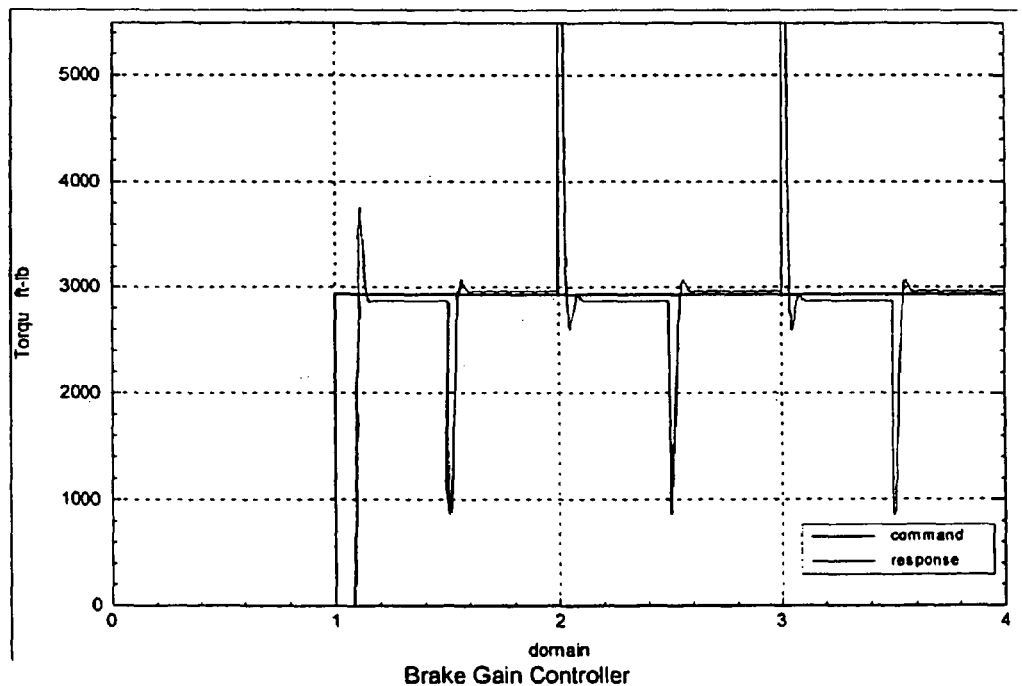
Brake Gain Controller  FIG. 8

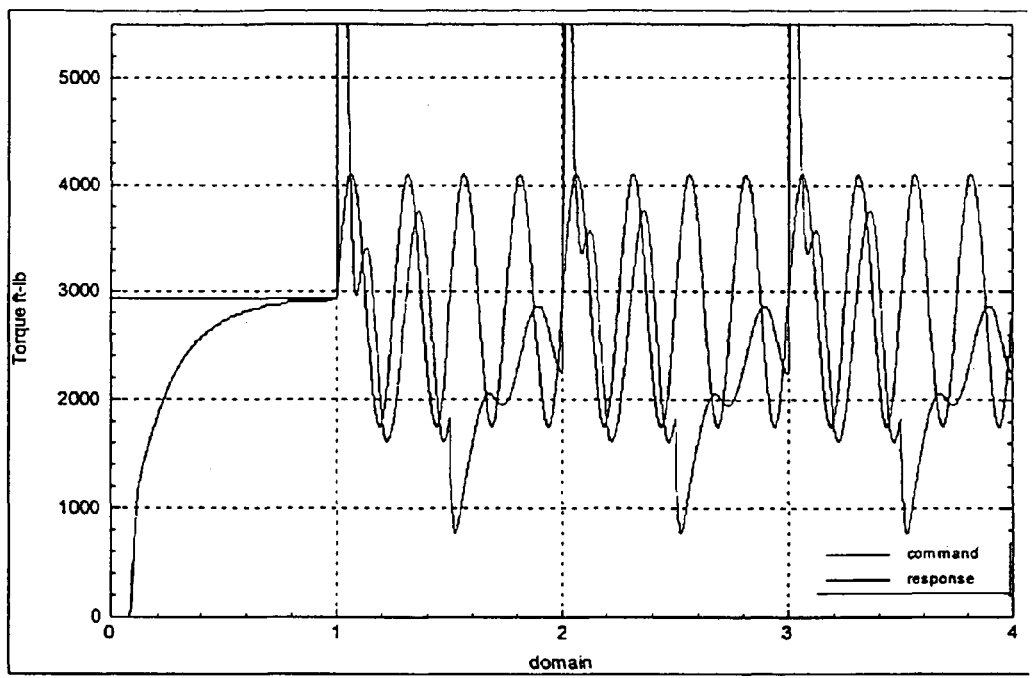
PRIOR ART PID Controller FIG. 13
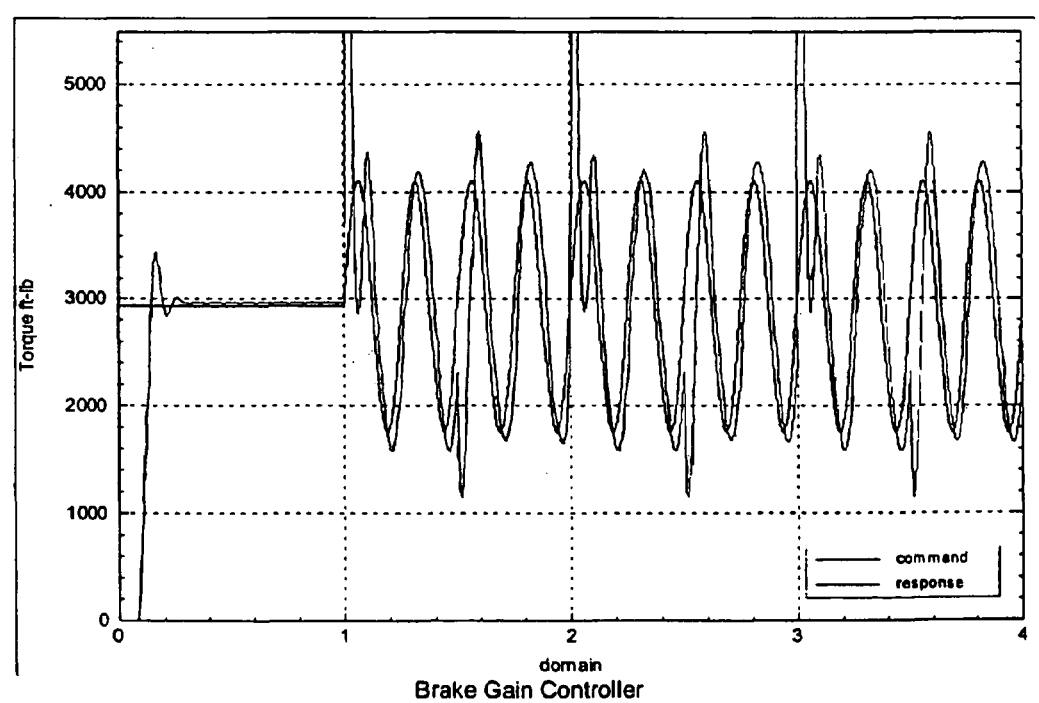
Brake Gain Controller
FIG. 14

BRAKE GAIN-BASED TORQUE CONTROLLER

TECHNICAL FIELD

The present invention relates generally to brake systems, and more particularly to a brake system based on a brake gain-based torque controller.

BACKGROUND ART

Brake systems for vehicles (e.g., aircraft, automobiles, etc.) are well known in the art. Most brake systems include a brake actuator for exerting pressure on brake material. The brake material in turn exerts a braking torque on the element to be braked (e.g., the wheel of the vehicle). The brake actuator may be hydraulic or electromechanical, for example. By selectively activating the brake actuator, a desired amount of braking torque, i.e., desired torque, or force, may be applied to the element to be braked.

In the past, torque feedback has been considered desirable in braking applications to compensate for various effects. For example, brake systems for vehicles have included a torque controller that utilizes the measured torque applied to the wheel to compensate for brake fade (due to thermal effects) and grabby brakes (common with carbon brakes). A torque sensor would measure the torque applied to the wheel, and the output of the torque sensor was fed back to the torque controller. The torque controller would modulate the brake actuator to apply the desired pressure to a brake to achieve the desired torque applied to the wheel.

Various problems arose, however, as a result of the use of torque feedback. For example, due to sensor noise and physical properties of torque, the output of the torque sensor, i.e., the measured torque signal, was not valid at or near zero wheel speed. To account for this, the torque feedback was disabled below a predefined wheel speed and the brake system would revert to open loop control. This "low speed cutout" of the torque feedback to the torque controller would naturally have to occur at a speed at which the output of the torque sensor was still valid. Since torque sensors typically are valid only to a predefined lower speed limit, the low speed cutout was required to occur at a speed greater than the lower speed limit. Thus, the limitations of the torque sensor precluded torque compensation at low wheel speeds.

Additional problems occur in torque controllers that employ a Proportional/Integral/Derivative (PID) controller. Measured torque is compared to the desired torque and a resulting torque error signal drives the PID controller to a desired pressure. However, the transfer function from pressure, i.e., clamp force, to torque occurs faster than the brake actuator generating the clamp force can respond. Additionally, the PID controller must be robust enough to compensate for changes in brake friction that normally occur during a stop.

In view of the aforementioned problems associated with torque controllers using torque feedback, there is a strong need in the art for a torque controller that calculates the pressure to be applied by the brake actuator based on measured torque in a time period in which the brake actuator can respond. Additionally, there is a need for a torque controller that can compute the pressure to be applied by the brake actuator at or near zero wheel speed. In addition, there is a strong need for such a torque controller which is not computationally intensive and which does not require multiple sensors, etc.

SUMMARY OF THE INVENTION

According to one particular aspect of the invention, the invention is a brake gain-based torque controller, comprising: an input for receiving a command torque indicative of a desired amount of brake torque applied to a wheel of a vehicle; an input for receiving a signal indicative of a measured amount of brake torque applied to the wheel, and an output for providing a brake pressure output command to a brake actuator and a brake assembly which applies a brake pressure to the wheel based on the brake pressure output command, wherein the brake gain-based torque controller adjusts the brake pressure output command provided to the brake actuator and the brake assembly using a computed inverse brake gain based on the signal indicative of a measured amount of brake torque applied to the wheel and a pressure signal indicative of an amount of the brake pressure applied by the brake assembly.

According to another aspect of the invention, the invention is a brake control system, comprising: an operator command device; a brake gain-based torque controller coupled to receive as a first input, a command torque output of the operator command device; a brake actuator coupled to receive a brake pressure output command from the brake gain-based torque controller; a brake assembly coupled to a wheel to apply a pressure to the wheel based on an output of the brake actuator coupled thereto; and a torque sensor coupled to the wheel to provide a torque signal to the brake gain-based torque controller indicative of the torque applied by the wheel to a vehicle, to which the wheel is coupled; wherein the torque signal is fed into the brake gain-based torque controller to determine a computed inverse brake gain to calculate the brake pressure output command of the brake gain-based torque controller in order to control the pressure to the wheel to achieve the command torque output.

According to another aspect of the invention, the invention is a method for controlling a braking torque applied to a wheel of a vehicle, comprising the steps of: receiving a brake torque command indicative of a desired amount of brake torque to be applied to the wheel, and providing a brake pressure output command to a brake actuator and a brake assembly which applies a brake torque to the wheel based on the brake pressure output command; measuring an amount of brake torque applied to the wheel and using a signal indicative of the amount of applied brake torque to perform torque feedback control of the brake pressure output command; and adjusting the brake pressure output command provided to the brake actuator using the torque feedback control based on the measured amount of brake torque, the adjusting step including a step of limiting a degree of the torque feedback control based on the amount of brake torque applied to the wheel.

To the accomplishment of the foregoing and related ends, the invention, then, comprises the features hereinafter fully described and particularly pointed out in the claims. The following description and the annexed drawings set forth in detail certain illustrative aspects of the invention. However, these aspects are indicative of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

These and further features of the present invention will be apparent with reference to the following description and drawings, wherein:

FIG. 7 is a graph of torque versus domain for a step input torque command, step brake gain and no brake friction dynamics for a prior art PID controller;

FIG. 8 is a graph of torque versus domain for a step input torque command, a step brake gain and no brake friction dynamics for a brake gain-based torque controller in accordance with the present invention;

FIG. 13 is a graph of torque versus domain for a sine input torque command, step brake gain and brake friction dynamics on for a prior art PID controller;

FIG. 14 is a graph of torque versus domain for a sine input torque command, step brake gain and brake friction dynamics on for a brake gain-based torque controller in accordance with the present invention.

DISCLOSURE OF INVENTION

Figure 1:
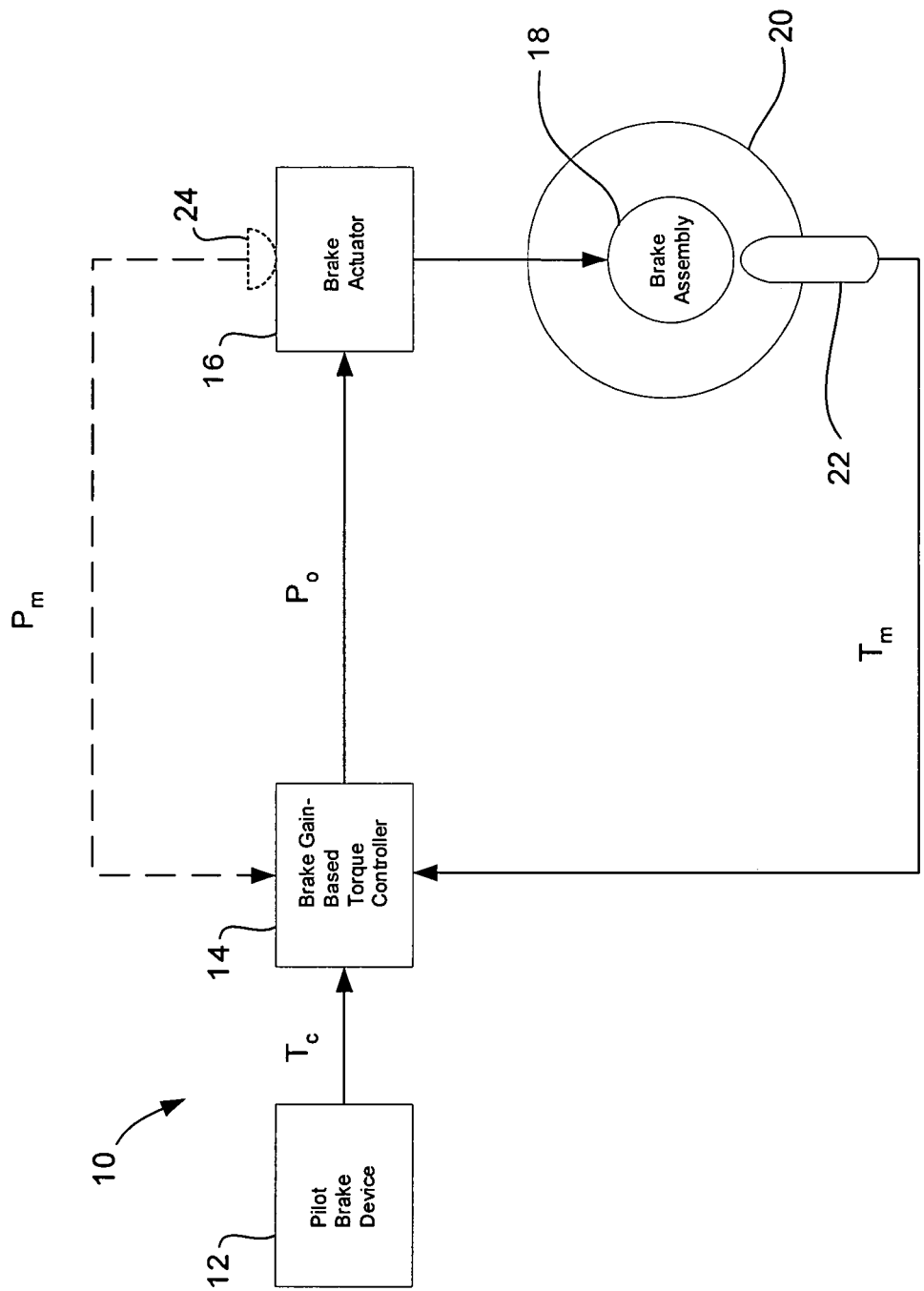
FIG. 1 is a block diagram of a brake system including a brake gain-based torque controller in accordance with the present invention.

In the detailed description that follows, identical components have been given the same reference numerals. To illustrate the present invention in a clear and concise manner, the drawings may not necessarily be to scale and certain features may be shown in a partial schematic format.

A brake gain-based torque controller of the present invention utilizes brake gain in order to provide brake control for a vehicle, such as an aircraft. The brake gain-based torque controller is one component of a brake control system coupled to a wheel. The brake control system, as further explained below, includes, inter alia, a pilot brake device, the brake gain-based torque controller, a brake actuator, a brake assembly and a torque sensor.

The pilot brake device is coupled to the brake gain-based torque controller to provide a pilot command torque signal $T_c$, also referred to as the desired torque. The brake gain-based torque controller is coupled to the brake actuator and provides a brake pressure output command signal $P_o$ to control a pressure applied by the brake actuator that is coupled to the brake assembly. The brake assembly is coupled to the wheel to apply the pressure to the brake material which in turn provides a torque to the wheel for braking the vehicle. A torque sensor is coupled to the wheel and the brake gain-based torque controller to provide a signal indicative of an amount of brake torque applied to the wheel to the brake gain-based torque controller, i.e., measured torque signal $T_m$. In one embodiment, a pressure sensor is coupled to the brake actuator and the brake gain-based torque controller to provide a pressure signal which his indicative of an amount of pressure applied to the wheel by the brake assembly to the brake gain-based torque controller, i.e., a measured pressure signal $P_m$. In another embodiment, a predetermined pressure signal $P_p$ based on a model of the brake actuator is contained in a look-up table and provided to the brake gain-based torque controller.

Thus, the brake gain-based torque controller is configured to receive three inputs, i.e., the pilot command torque signal $T_c$, the measured torque signal $T_m$ and a pressure signal (either measured pressure signal $P_m$ or predetermined pressure signal $P_p$), and to output the brake pressure output command signal $P_o$. The brake actuator uses the brake pressure output command signal $P_o$ to modulate the pressure applied to the brake assembly in order to achieve a desired torque applied to the wheel.

Brake gain is the ratio of torque to pressure. Brake gain or the inverse of brake gain, i.e., the ratio of pressure to torque, can be used to produce the brake pressure output command signal $P_o$ that controls the pressure applied to the brake assembly, as further explained below. A torque sensor for providing the measured torque signal and a pressure signal, i.e., $P_m$ or $P_p$, provided by a pressure sensor or a look-up table, are all that are needed to calculate brake gain or inverse brake gain. Consequently, additional sensors are not necessary.

In general, an exemplary brake-gain-based torque controller calculates a computed inverse brake gain $I_k$ in real-time. Under one set of criteria (as further explained below), the brake gain-based torque controller multiplies the computed inverse brake gain $I_k$ by the command torque signal $T_c$ to output the brake pressure output command signal $P_o$. Under another set of criteria (as further explained below), the brake gain-based torque controller outputs the command torque signal $T_c$ as the brake pressure output command signal $P_o$. The brake actuator uses the brake pressure output command signal $P_o$ to control the pressure to be applied to the brake assembly in order to achieve the desired torque applied to a wheel. That is, based on the brake pressure output command signal $P_o$, the brake actuator applies the pressure to the brake assembly.

Additionally, the brake gain-based torque controller uses the measured torque signal $T_m$ and the pressure signal indicative of an amount of pressure applied by the brake actuator to adapt to varying braking conditions. For example, the brake gain-based torque controller reduces the pressure applied by the brake actuator in the event a brake begins to grab. Upon calculating an acceptable computed inverse brake gain $I_k$ within limits of the brake system, the torque controller increases the pressure (allows the pressure applied to return to normal conditions). Further, the brake gain-based torque controller uses the measured torque of the wheel to determine the amount of desired torque appropriate for the braking conditions.

Referring initially to FIG. 1, a brake control system with a brake gain-based torque controller as used in an aircraft in accordance with the present invention is generally designated 10. Generally speaking, brake control on an aircraft is usually structured in a paired wheel configuration for functional modularity. For example, if the aircraft has two wheels on the left side of the aircraft and two wheels on the right side, the outer two wheels form a pair and the inner two wheels form another pair. Within a pair, there is a right wheel control and left wheel control.

The left and right wheel control functions are uncoupled except for locked wheel protection. The basic unit therefore consists of a control for a single wheel that can be left or right. As utilized herein, it will be appreciated that the term "wheel" is intended to refer collectively to both the wheel and tire.

For sake of simplicity, the brake control system 10 (also referred to herein as system 10) as shown in FIG. 1 represents the basic unit for providing brake control of a single wheel (left or right). However, it will be appreciated that control for the other wheel(s) can be provided via a corresponding system(s) 10 or in a single system incorporating the same inventive principles. Moreover, the present invention as described provides brake control in connection with an aircraft. Nevertheless, it will be appreciated that the brake control system 10 including a brake gain-based torque controller according to the present invention has utility for virtually any type of vehicle and is not limited necessarily to brake control for aircraft. Further, the brake control system according to the present invention could also be used in a test environment with brake dynamometers, for example.

The system 10 includes a pilot brake device 12 for providing operator or pilot commanded brake control. In addition, the system 10 includes a brake gain-based torque controller 14. The brake gain-based torque controller 14 controls the amount of torque applied by the braking system 10 as is described more fully below. Specifically, the brake gain-based torque controller 14 is designed to provide a brake pressure output command signal $P_o$ ultimately to a brake actuator 16 included in the system 10. The brake actuator 16 may be any conventional type actuator (e.g., hydraulic, pneumatic or electromechanical) for applying pressure to a brake material (not shown) in a brake assembly 18. In one embodiment, the brake actuator 16 may include a flow control valve (not shown) that controls the flow of hydraulic fluid provided to the brake assembly 18. In another embodiment, the brake actuator 16 may include a hydraulic pressure valve (not shown) that controls the amount of pressure applied by the brake actuator 16 to the brake material. The brake assembly 18 in turn provides braking action to a wheel 20 by exerting a braking torque or force on the wheel 20 as is conventional. The wheel 20 is coupled to the aircraft (or other vehicle) via a conventional structure (not shown).

The system 10 further includes a brake torque sensor 22 that measures the amount of torque exerted by the brake actuator 16 and brake assembly 18 on the wheel 20. The brake torque sensor 22 may be any conventional torque sensor that provides an output signal (i.e., measured torque signal $T_m$) indicative of the braking torque on the wheel. The measured torque signal $T_m$ is input to the brake gain-based torque controller 14 included in the system 10.

In one embodiment, the system 10 further includes a pressure sensor 24 (shown as a dashed line in FIG. 1). The pressure sensor 24 measures the pressure created by the brake actuator 16. The pressure sensor 24 may be any conventional pressure sensor. The output (shown as a dashed line in FIG. 1) of the pressure sensor 24, a measured pressure signal $P_m$, represents the pressure provided to the brake assembly 18. The measured pressure signal $P_m$ is fed back to the brake gain-based torque controller 14. Thus, the measured pressure signal $P_m$ is utilized as an input to the brake gain-based torque controller 14 representative of the applied pressure.

In the embodiment where the brake actuator 16 is hydraulic, the pressure sensor 24 can measure the hydraulic brake pressure created by the brake actuator 16 as a result of controlling the flow control valve using the brake pressure output command signal $P_o$. In this embodiment, the measured pressure signal $P_m$ of the pressure sensor 24 will represent the hydraulic brake pressure provided to the brake assembly 18.

As will be described more fully below in relation to FIG. 2, the brake gain-based torque controller 14 effectively controls the pilot command torque signal $T_c$ applied to the brake assembly 18. For example, if the wheel 20 has a measured torque signal $T_m$ greater than the aforementioned desired command torque signal $T_c$, the brake gain-based torque controller 14 reduces the value of the brake pressure output command signal $P_o$. In the event the wheel 20 has a measured torque signal $T_m$ less than the desired command torque signal $T_c$, the brake gain-based torque controller 14 will increase the value of the brake pressure output command signal $P_o$ until full pilot command torque signal $T_c$ is applied to the brake assembly 18.

Figure 15:
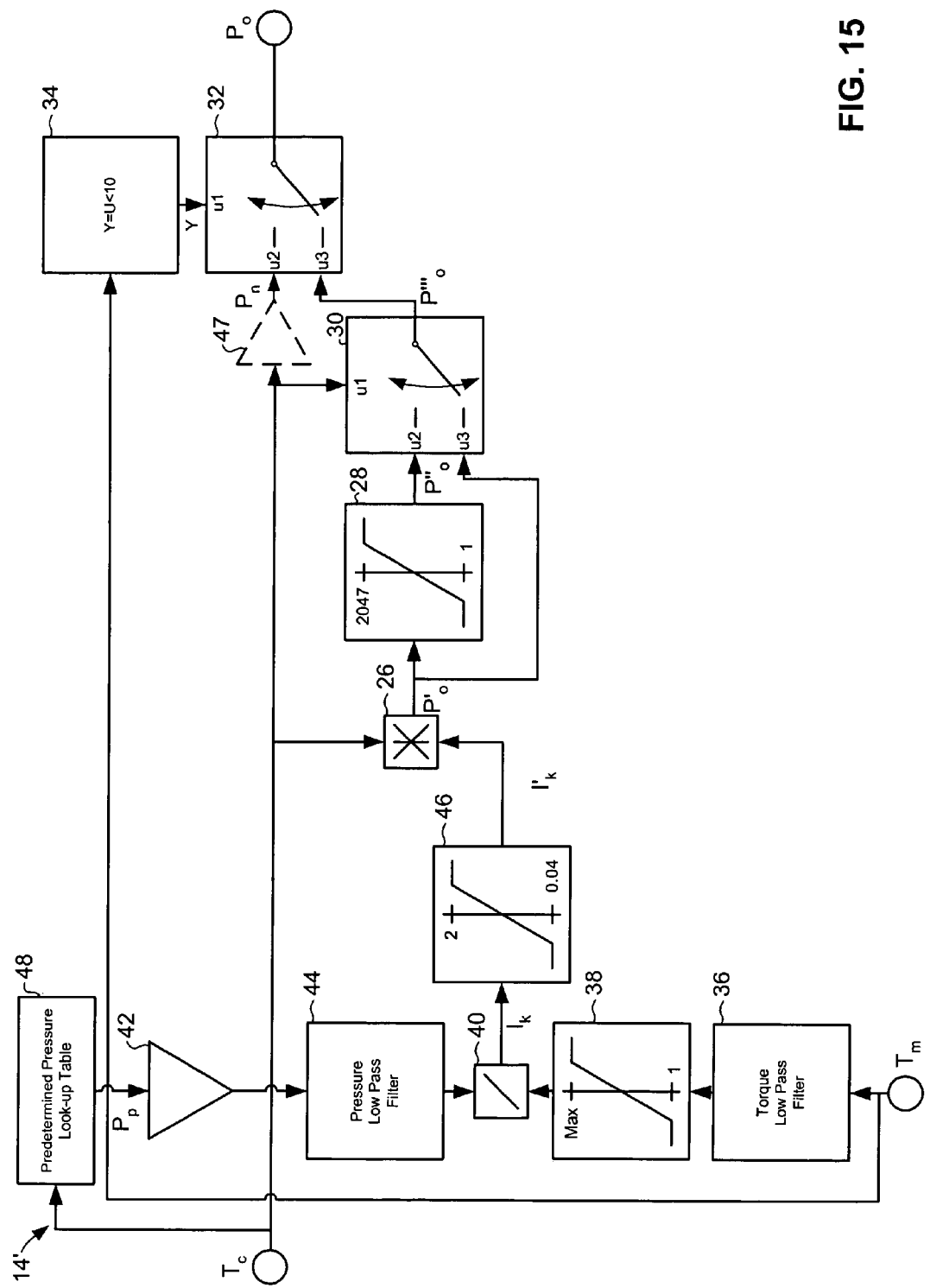
FIG. 15 is a detailed block diagram of a brake system including a brake gain-based torque controller in accordance with another exemplary embodiment of the present invention.

As will be discussed in detail below, the brake gain-based torque controller 14 estimates the pressure to apply to the wheel 20. In one embodiment, a computed inverse brake gain $I_k$ is calculated using the measured torque signal $T_m$ provided from the torque sensor 22 and the measured pressure signal $P_m$ provided from the pressure sensor 24. In another embodiment, a computed inverse brake gain $I_k$ is calculated using the measured torque signal $T_m$ provided from the torque sensor 22 and the predetermined pressure signal $P_p$ provided from a look-up table 48 (FIG. 15), as further explained below. Under one set of criteria, the brake gain-based torque controller 14 then multiplies the desired torque, i.e., the command torque signal $T_c$, by the computed inverse brake gain $I_k$ to produce the brake pressure output command signal $P_o$. The brake gain-based torque controller 14 outputs the brake pressure output command signal $P_o$, which varies in value, e.g., from "0" to "1". The brake pressure output command signal $P_o$ is output by the brake gain-based torque controller 14 to the brake actuator 16. The brake actuator 16 consequently applies a braking force to the wheel 20 based on the brake pressure output command signal $P_o$.

Generally describing the operation of the system 10, the pilot brake device 12 comprises a pedal or equivalent thereof. During a braking event, the pilot of the aircraft activates the pilot brake device 12 by pushing the pedal (or its equivalent). The depression of the pedal is converted to an electrical signal (command torque signal $T_c$) that is provided to the brake gain-based torque controller 14. The value of the command torque signal $T_c$ is indicative of the degree of depression of the pedal, and is related to the amount of braking torque commanded by the pilot. Under one set of criteria, the brake gain-based torque controller 14 multiplies the command torque signal $T_c$ by the computed inverse brake gain $I_k$ to output the brake pressure output command signal $P_o$. Under another set of criteria, the brake gain-based torque controller 14 outputs the command torque signal $T_c$ as the brake pressure output command signal $P_o$. It will be appreciated that the brake pressure output command signal $P_o$ will be a pressure signal for a hydraulic brake or a force signal for an electric brake, for example.

As mentioned above, the brake pressure output command signal $P_o$, is input to the brake actuator 16. The brake actuator 16 in turn applies pressure to the brake assembly 18 based on the brake pressure output command signal $P_o$ in an otherwise conventional manner. The applied brake pressure results in a reduction in the rotational speed of the wheel 20 which is measured by the brake torque sensor 22 and fed back to the brake gain-based torque controller 14. Thus, the present invention provides closed loop brake control based on the torque applied to the wheel 20. In the exemplary embodiment, the only input parameters are command torque, measured torque and measured pressure, thus eliminating the need for additional sensors that add to complexity and cost. In another embodiment, the pressure signal is provided by a pressure look-up table contained in the brake gain-based controller 14. Thus, the pressure sensor may be eliminated and further reduction in complexity and cost can be accomplished.

Figure 2:
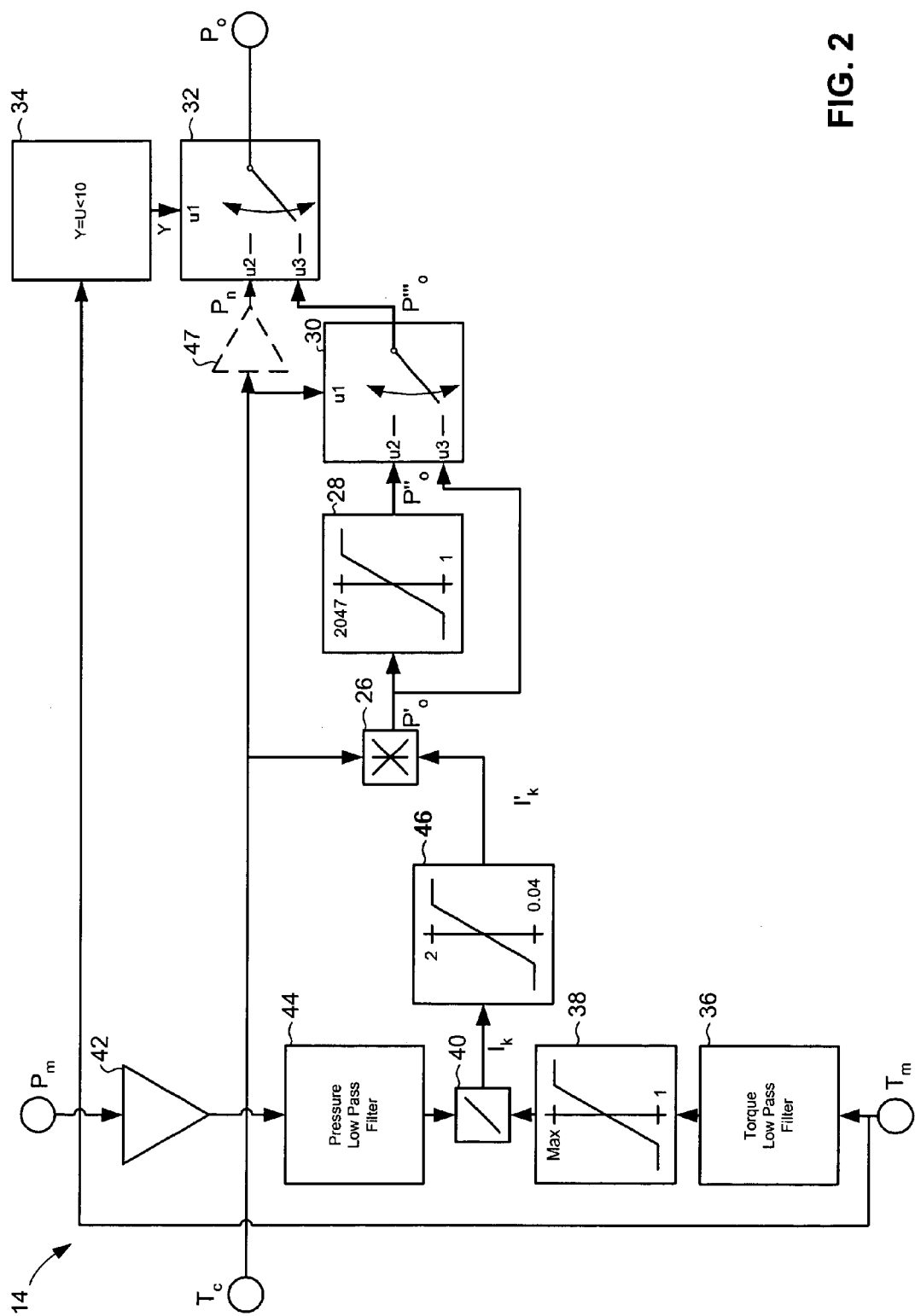
FIG. 2 is a detailed block diagram of the brake gain-based torque controller in accordance with an exemplary embodiment of the present invention.

Referring now to FIG. 2, a detailed block diagram of the brake gain-based torque controller 14 is shown. As will be appreciated, the brake gain-based torque controller 14 in the exemplary embodiment is a digital controller represented as operating in the z-domain. The measured torque signal $T_m$ from the brake torque sensor 22 is sampled at a rate of 800 samples per second, for example, although clearly other sampling rates could be used. Moreover, other digital or analog control techniques are possible and the precise implementation described herein should not be construed as limiting in scope.

As represented in FIG. 2, the command torque signal $T_c$ representing the desired amount of brake torque is provided to one input of a multiplier 26. The multiplier 26 multiplies the command torque signal $T_c$ by a limited computed inverse brake gain $I'_k$ which is provided to the other input of the multiplier 26. The output of the multiplier 26 represents a brake pressure output command signal $P'_o$. The brake pressure output command signal $P'_o$ is input to a limiter 28.

The limiter 28 limits the brake pressure output command signal $P'_o$ output from the multiplier 26 to a predefined range, e.g., 1 to 2047. The limited output $P''_o$ from the limiter 28 is input to a first terminal (u2) of a two-position switch 30. The brake pressure output command signal $P'_o$ of the multiplier 26 is also input to a second terminal (u3) of the switch 30. The command torque signal $T_c$ is input to a control terminal (u1) of the switch 30. The pole terminal of the switch 30 is the limited output $P''_o$ or the brake pressure output command signal $P'_o$, depending on the position of the switch 30. The position of the switch 30 is controlled by the command torque signal $T_c$, as further explained below. The output of the switch 30 represents a brake pressure output command signal $P'''_o$.

For example, if the command torque signal $T_c$ is equal to "0", then the switch 30 connects to the second terminal (u3) to output the brake pressure output command signal $P'_o$. If the command torque signal $T_c$ is greater than "0", then the switch 30 connects to the first terminal (u2) to output the limited output $P''_o$.

The command torque signal $T_c$ is also input to a first terminal (u2) of a two-position switch 32. The brake pressure output command signal $P'''_o$ from the two position switch 30 is input to a second terminal (u3) of the switch 32. A control signal Y output by block 34 is input to a control terminal (u1) of the switch 32. The pole terminal of the switch 32 is the command torque signal $T_c$ or the brake pressure output command signal $P'''_o$, depending on the position of the switch. The position of the switch is controlled by the control signal Y, as further explained below. The output of the switch 32 is the pole terminal of the switch 32 and represents the brake pressure output command signal $P_o$.

The measured torque signal $T_m$ is input to an input of the block 34 included in the brake gain-based torque controller 14. The control signal Y (i.e., the control signal Y=U<10) output by block 34 controls whether the command torque signal $T_c$ or the brake pressure output command signal $P'''_o$ is output by the brake gain-based torque controller 14 as the brake pressure output command signal $P_o$ to control the pressure applied to the wheel 20.

The control signal Y is based on the equation Y=U<10, where U is the measured torque signal $T_m$. If the measured torque signal $T_m$ is less than a predetermined value, e.g., "10" in block 34, then the control signal Y output by block 34 to the switch 32 is "1". When the control signal "Y" is "1", the switch 32 connects to the first terminal (u2) to pass the command torque signal $T_c$ as the brake pressure output command signal $P_o$ of the brake gain-based torque controller 14. On the other hand, if the measured torque signal $T_m$ is equal to or greater than the predetermined value, e.g., "10" by block 34, then the control signal Y output by block 34 to the switch 32 is "0". When the control signal Y is "0" the switch 32 connects to the second terminal (u3) to pass the brake pressure output command signal $P'''_o$ as the brake pressure output command signal $P_o$ of the brake gain-based torque controller 14.

Additionally, the measured torque signal $T_m$ is input to a first order, low-pass filter 36 with a cut-off frequency of 10 radians/second (rad/sec). The measured torque signal $T_m$ is input to the low-pass filter 36 to remove any noise that is present in the measured torque signal $T_m$. Preferably, the low-pass filter 36 is designed so as not to introduce excess lag into the system, as response time in torque controllers is essential.

The filtered output from the low-pass filter 36 is then input to a positive limiter 38 which limits the measured torque signal $T_m$ output from the torque sensor 22 to a predefined positive range (e.g., 1 to max, e.g., 10,000 (not shown in FIG. 2)). The limited output from the positive limiter 38 is input to a denominator input of a divider 40. The positive limiter 38 limits a minimum value of the filtered measured torque signal to 1 in order to prevent divide by zero errors in the divider 40.

In the case where the system 10 includes a pressure sensor 24, the measured pressure signal $P_m$ is input to a gain amplifier 42 having a nominal gain in order to scale the measured pressure signal $P_m$ to be consistent, i.e., of the same scale, with other forms of pressure measurement. The output of the gain amplifier 42 is provided to a first order, low-pass filter 44 with a cut-off frequency of 10 radians/second (rad/sec). The measured pressure signal $P_m$ is input to the low-pass filter 44 to remove any noise that is present in the measured pressure signal $P_m$. Preferably, the low-pass filter 44 is also designed so as not to introduce excess lag into the system, as response time in torque controllers is essential.

The filtered output from the low-pass filter 44 is then input to a numerator input of the divider 40. The output of the divider 40 is the computed inverse gain $I_k$. The computed inverse brake gain $I_k$ is input to a limiter 46. The limiter 46 has a lower limit of 0.04, for example, and an upper limit of 2, for example. The output of the limiter 46 is the limited computed inverse brake gain $I'_k$. The limited computed inverse brake gain $I'_k$ is input to the second input of the multiplier 26 as described above.

Under normal braking conditions, the commanded torque signal $T_c$ will be greater than "0" and the measured torque signal $T_m$ will be greater than "10". Accordingly, switch 30 will connect to the first terminal (u2) to pass the limited output $P'''_o$ as the brake pressure output command signal $P''''_o$ of switch 30 to the second terminal (u3) input of switch 32. Further, since the measured torque signal $T_m$ is greater than 10 in block 34, block 34 outputs a control signal Y of "0" to the switch 32. Accordingly, switch 32 will connect to the second terminal (u3) and pass the limited output $P'''_o$ as the brake pressure output command signal $P_o$ of the brake gain-based torque controller 14.

Accordingly, as the value of the limited computed inverse brake gain $I'_k$ varies, e.g., from "0" to "1" as described above, the maximum brake pressure output command signal $P_o$ that is passed on to the brake actuator 16 is controlled. It has been found that control of the switch 32 and the switch 30, based on the value of the measured torque signal $T_m$ and the command torque signal $T_c$, respectively, provides smooth brake control.

In view of the above, it will be appreciated that the brake gain-based torque controller 14 of the present invention utilizes a computed brake gain or a computed inverse brake gain in order to provide brake control for a vehicle, such as an aircraft. The command torque signal $T_c$ is multiplied by the computed inverse brake gain $I_k$, i.e., the ratio or pressure to torque, to determine the amount of pressure to apply to the wheel 20 in order to achieve the desired torque.

When there is no torque being generated because the brake pedals are not being depressed, the computed inverse brake gain has no meaning and its value is limited to expected ranges. For example, in this case, the command torque signal $T_c$ is equal to "0" and the measured torque signal $T_m$ is equal to "0". Accordingly, switch 30 connects to the second terminal (u3) to pass the brake pressure output command signal $P'_o$ (which will be "0" because $T_c$ equals "0") to the second terminal (u3) of the switch 32. Since the measured torque signal $T_m$ is less than "0", block 34 outputs a control signal Y equal to "1". Accordingly, switch 32 connects to the first terminal (u2) and passes the brake pressure output command signal $P'_o$ as the brake pressure output command signal $P_o$ of the brake gain-based torque controller 14. After the brake pedals are depressed, the minimum applied pressure should be sufficient to take up the running clearance in the brake so that torque will be generated if the wheel is turning. If no torque is generated because the wheel is not turning, the applied pressure should be in proportion to the desired torque. For example, in this case, the command torque signal $T_c$ is greater than "0" and the measured torque signal $T_m$ is less than "10". Since the measured torque signal $T_m$ is less than "10", block 34 outputs a control signal Y equal to "1". Accordingly, switch 32 connects to the first terminal (u2) and passes the commanded torque signal $T_c$ as the brake pressure output command signal $P_o$ of the brake gain-based torque controller 14. Thus, the brake-gain based controller 14 can be used at or near zero wheel speed.

In the exemplary embodiment, the brake gain-based torque controller 14 is operated based on measured pressure and measured torque. However, those having ordinary skill in the art will understand that the brake gain-based torque controller 14 is capable of operating based only on measured torque, thus additional sensors are not necessary.

In one embodiment, the brake gain-based torque controller 14 further includes a gain amplifier 47 (shown as a dashed triangle in FIG. 2) having a nominal value of the inverse brake gain $I_k$ for scaling in order to scale the command torque signal $T_c$. Accordingly, the commanded torque signal $T_c$ is input into an input of the gain amplifier 47. The output of the gain amplifier 47 is a nominal brake pressure output command signal $P_n$. The output of the gain amplifier 47 is provided to the input of the first terminal (u2) of the two-position switch 32. Thus, the gain of the nominal value of the inverse brake gain is applied to the command torque $T_c$ to output a nominal brake pressure output command signal $P_n$.

In another embodiment, the predefined range of the limiter 28 may be, e.g., 0 to 2047. The output of the limiter 28, i.e., the limited output $P''_o$ can be input to the second terminal (u3) of the two-position switch 32. Accordingly, the switch 30 and the input and output connections thereto can be removed. Thus, the operation of the brake gain-based torque control 14 is simplified. That is, when the brake pressure output command signal $P'_o$ is 0, it is fed through the limiter 28 with a lower limit of 0, and output as the limited output 28 $P''_o$. The limited output 28 $P''_o$ is fed directly to the second terminal (u3) of the two-position switch 32, without the intervening switch 30.

In order to better understand the principles behind the operation of the brake gain-based torque controller 14, the following technical background is considered helpful. As is understood by those having ordinary skill in the art, brake friction coefficient is the proportion of clamp force on a brake stack that is converted to a drag force on a brake (i.e., a torque). The brake friction coefficient is a function of many variables, e.g., brake lining material, temperature, roughness and the like. A computed brake gain is a quick estimate of the brake friction coefficient, i.e., a ratio of torque to pressure, hereinafter may also be referred to as clamp force.

From a brake actuator's perspective, conversion from pressure to torque is non-dynamic, or a type 0 system. Therefore, torque is related to pressure by a constant, i.e., the computed brake gain. The brake-gain-based torque controller 14 calculates a computed inverse brake gain $I_k$ in real-time. The brake-gain-based torque controller 14 uses the computed inverse brake gain $I_k$ to scale the pilot command torque signal $T_c$. The scaled pilot command torque signal, i.e., the brake pressure output command signal $P_o$, is used in computing a pressure to be applied by the brake actuator 16 to the brake assembly 18 in order to achieve a desired torque applied to the wheel 20.

Computed brake gain is the ratio of torque to pressure, or $$K = T/P \qquad \text{Equ. 1}$$

where K is the computed brake gain, T is torque, and P is pressure. If the torque is measured and the pressure is measured, then Equ. 1 can be expressed as follows:

$$K = T_m/P_m \qquad \text{Equ. 2}$$

where K is the computed brake gain, $T_m$ is measured torque, and $P_m$ is measured pressure. The inverse of computed brake gain K is the ratio of pressure to torque and is represented by the computed inverse brake gain $I_k$ and can be expressed as follows:

$$I_k = P_m/T_m \qquad \text{Equ. 3}$$

To compute the pressure to be applied, the desired torque, Td, is scaled by the computed inverse brake gain $I_k$, or $$Pa = Td \times I_k \qquad \text{Equ. 4}$$

where Pa is the pressure commanded actuator pressure. The pressure commanded actuator pressure Pa is representative of the brake pressure output command signal $P_o$ produced by the brake gain-based torque controller 14. The desired torque, Td, is representative of the piloted commanded torque, i.e., the command torque signal $T_c$. Thus, by substituting the brake pressure output command signal $P_o$ and the command torque signal $T_c$ into Equ. 4, Equ. 4 can be rewritten as follows:

$$P_i = T_c \times I_k \qquad \text{Equ. 5}$$

Next, Equ. 3 can be substituted into Equ. 5. Accordingly, Equ. 5 can be rewritten as follows:

$$P_o = T_c \times P_m/T_m \qquad \text{Equ. 6}$$

The brake gain-based torque controller 14 is configured to carry out Equ. 6.

A brake gain-based torque controller in accordance with the present invention was compared through simulation with a PID torque controller. The simulation cases vary by command torque (constant or sinusoidal), brake gain (constant, at 5 or step changing from 3 to 10 every ½ second), and brake friction dynamics (constant or 20 Hz response). Measurement noise was not used in these figures to simplify the presentation.

Figure 3:
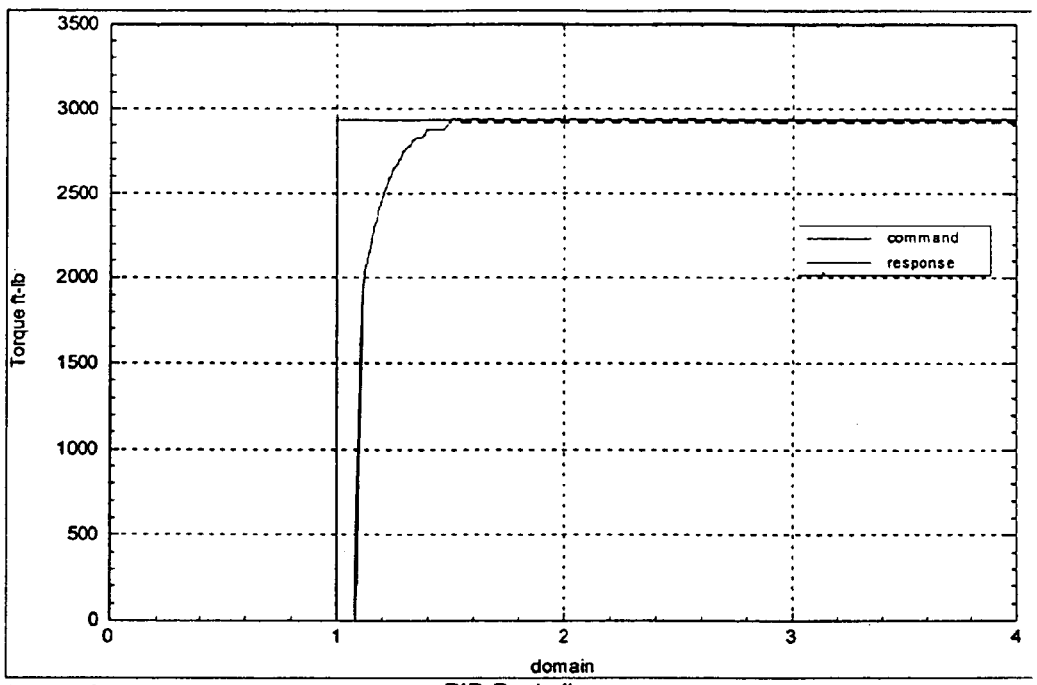
FIG. 3 is a graph of torque versus domain for a step input torque command, computed brake gain and no brake friction dynamics for a prior art PID controller.
Figure 4:
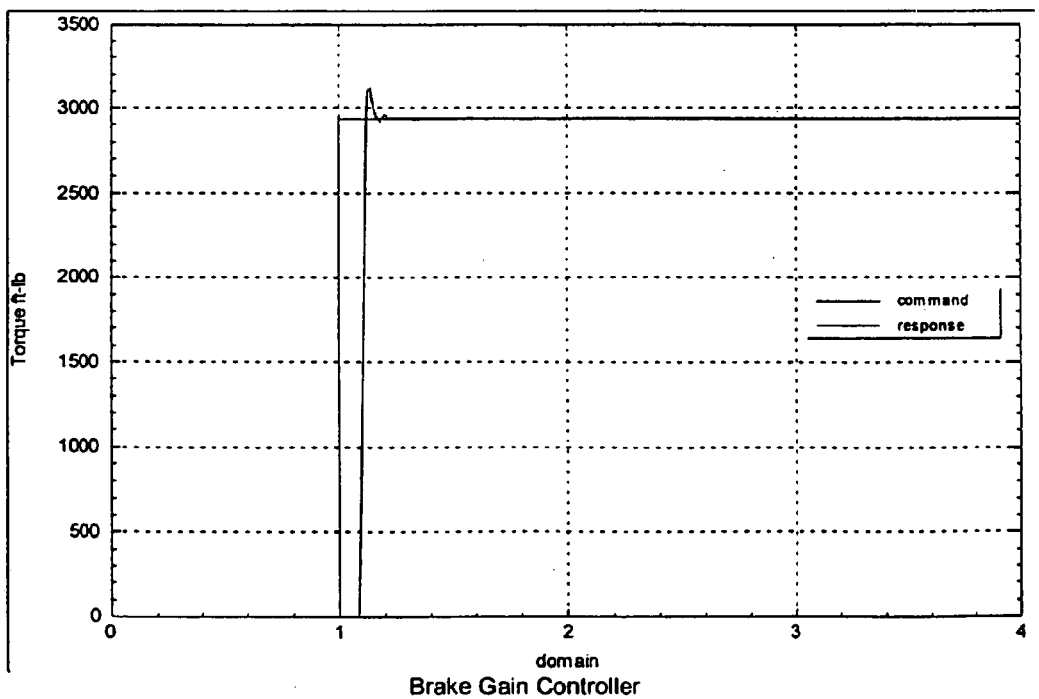
FIG. 4 is a graph of torque versus domain for a step input torque command, computed brake gain and no brake friction dynamics for a brake gain-based torque controller in accordance with the present invention.

FIG. 3 is a plot illustrating the operation of a PID torque controller with a constant command torque, a constant brake gain and constant brake friction dynamics. The plot shown in FIG. 3 is to be compared with the plot shown in FIG. 4 which illustrates the corresponding operation of the brake gain-based torque controller in accordance with the embodiment of FIG. 1. Most notable, the PID torque controller represented in FIG. 3 exhibits a slow convergence of the response to the commanded torque generally labeled C and R, respectively, at the application of braking from zero. The slow convergence to the commanded torque is avoided in the present invention as illustrated in FIG. 4. As illustrated in FIG. 4, a slight overshoot, labeled O, occurs at the initial commanded torque, however, the overshoot is quickly damped out.

Figure 5:
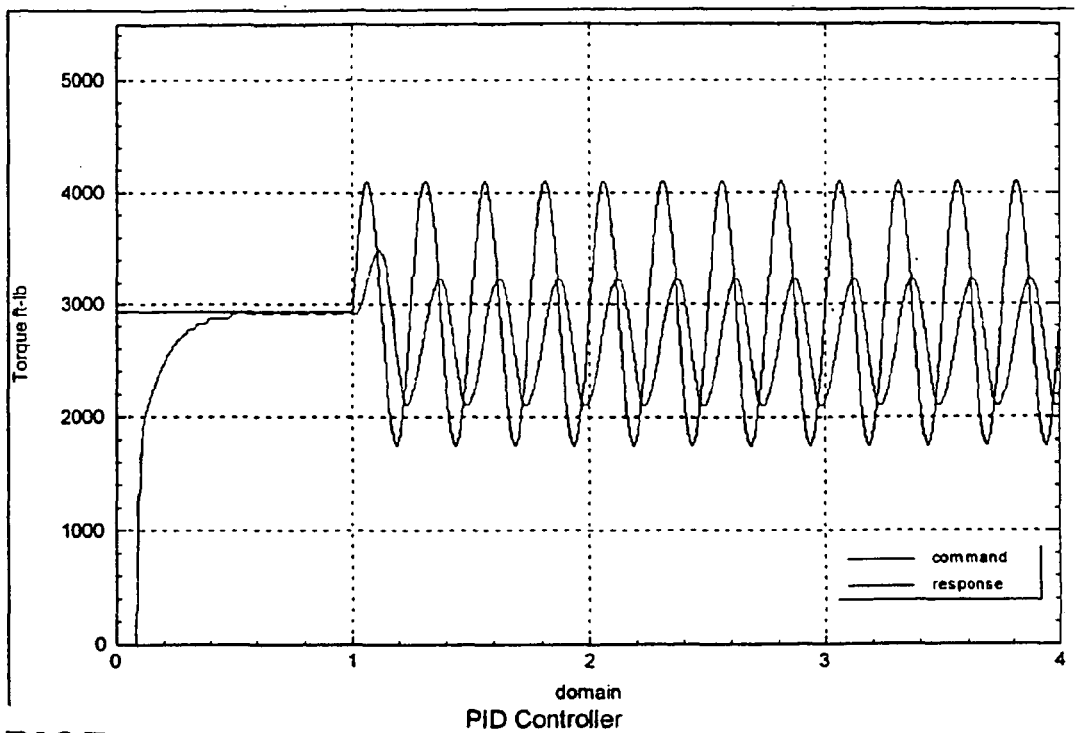
FIG. 5 is a graph of torque versus domain for a sine input torque command, constant brake gain and no brake friction dynamics for a prior art PID controller.
Figure 6:
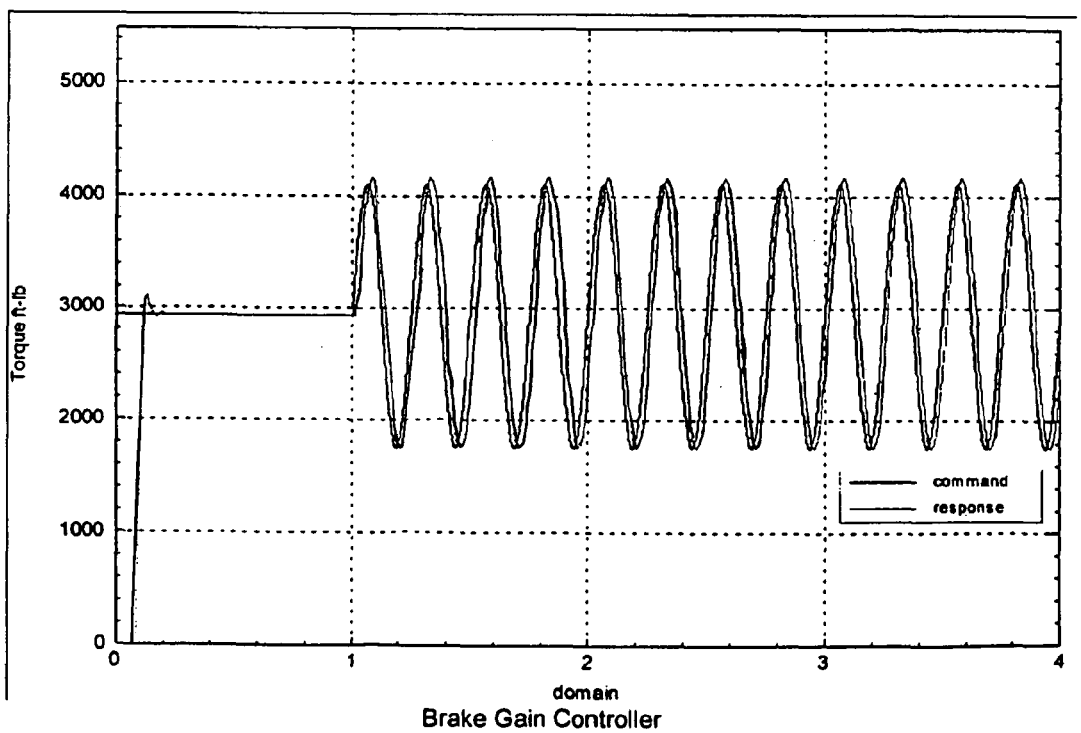
FIG. 6 is a graph of torque versus domain for a sine input torque command, constant brake gain and no brake friction dynamics for a brake gain-based torque controller in accordance with the present invention.

FIG. 5 is a plot illustrating the operation of the PID torque controller with a sine input for the torque command, a constant brake gain and constant brake friction dynamics. The plot shown in FIG. 5 is to be compared with the plot shown in FIG. 6 which illustrates the corresponding operation of the brake gain-based torque controller 14 in accordance with the present invention. The PID controller represented in FIG. 5 exhibits a response which is less than half the amplitude and approximately 90 degrees out of phase. As illustrated in FIG. 6, the response of the brake gain-based torque controller 14 is approximately the same amplitude and only slightly out of phase.

FIG. 7 is a plot illustrating the operation of the PID torque controller with a step input torque command, a step brake gain, and constant brake friction dynamics. The plot shown in FIG. 7 is to be compared with the plot shown in FIG. 8 which illustrates the corresponding operation of the brake gain-based torque controller 14 in accordance with the present invention. The response of the PID controller represented in FIG. 7 exhibits a slow recovery to the step input torque commanded (generally labeled as SR). As illustrated in FIG. 8, the response of the brake gain-based torque controller 14 avoids the slow recovery.

Figure 9:
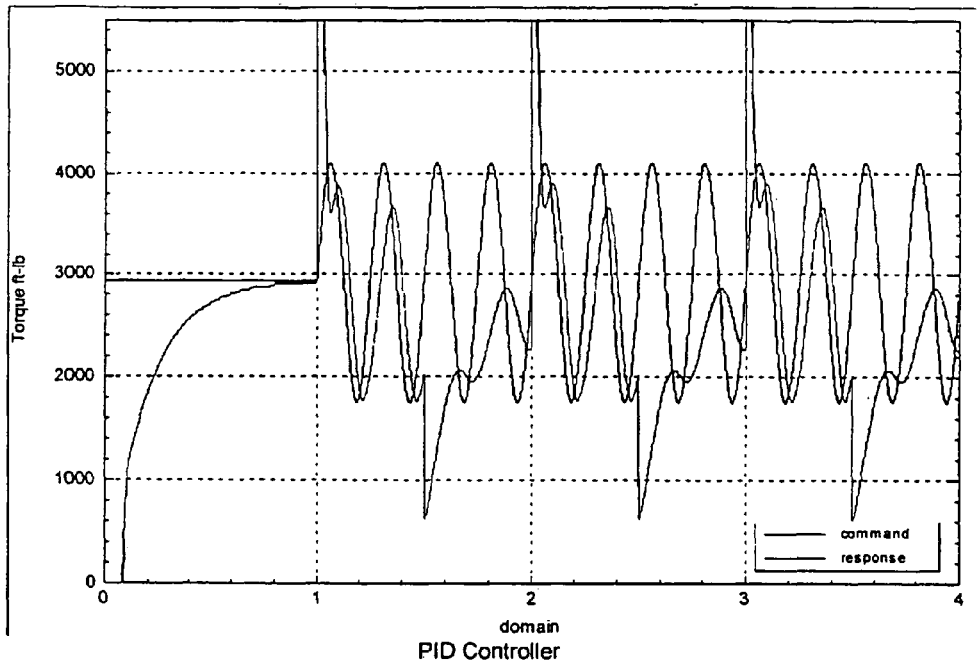
FIG. 9 is a graph of torque versus domain for a sine input torque command, step brake gain and no brake friction dynamics for a prior art PID controller.
Figure 10:
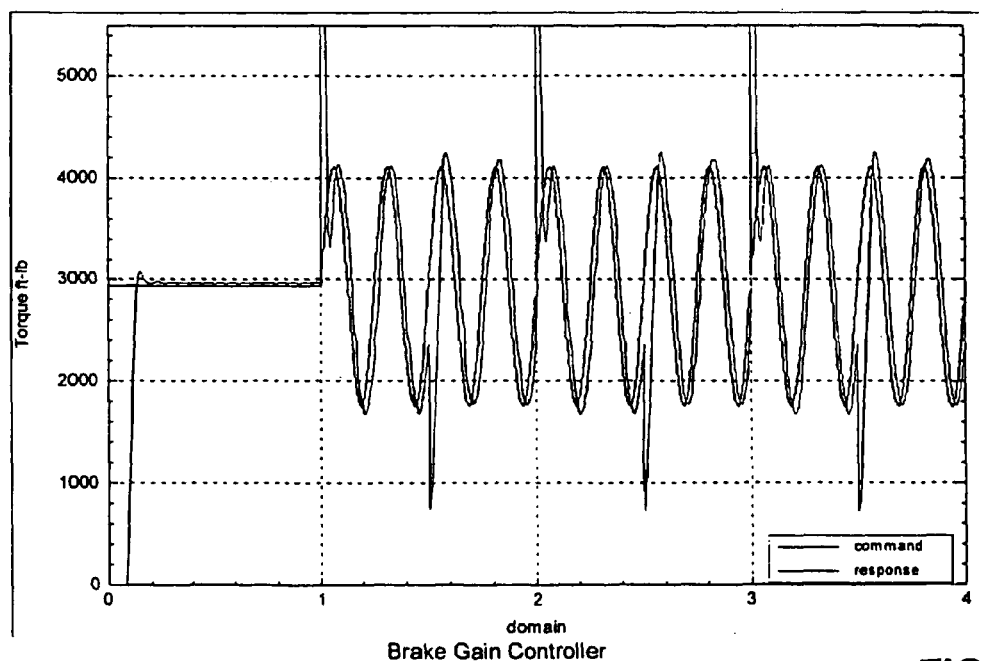
FIG. 10 is a graph of torque versus domain for a sine input torque command, step brake gain and no brake friction dynamics for a brake gain-based torque controller in accordance with the present invention.

FIG. 9 is a plot illustrating the operation of the PID torque controller with a sine input torque command, a step brake gain, and no brake friction dynamics. The plot shown in FIG. 9 is to be compared with the plot shown in FIG. 10 which illustrates the corresponding operation of the brake gain-based torque controller 14 in accordance with the present invention. The response of the PID controller represented in FIG. 9 exhibits a slow recovery to the step input torque commanded (generally labeled as SR). The response of the brake gain-based torque controller 14 rapidly recovers from the step input torque commanded as illustrated in FIG. 10.

Figure 11:
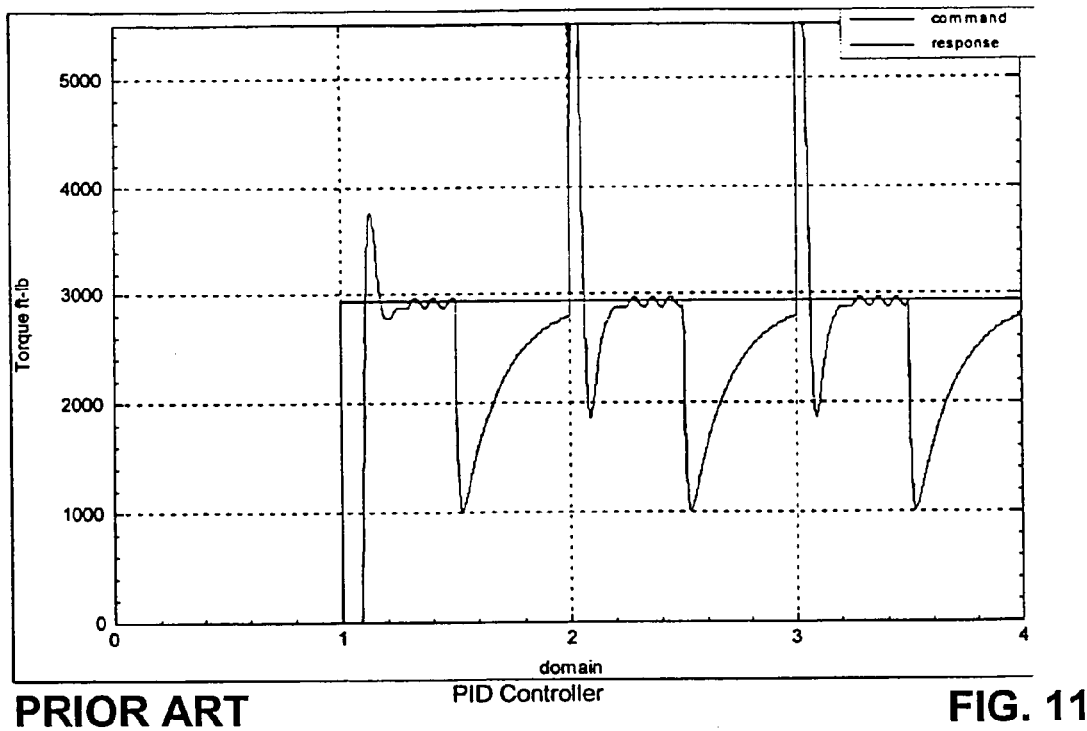
FIG. 11 is a graph of torque versus domain for a step input torque command, step brake gain and brake friction dynamics on for a prior art PID controller.
Figure 12:
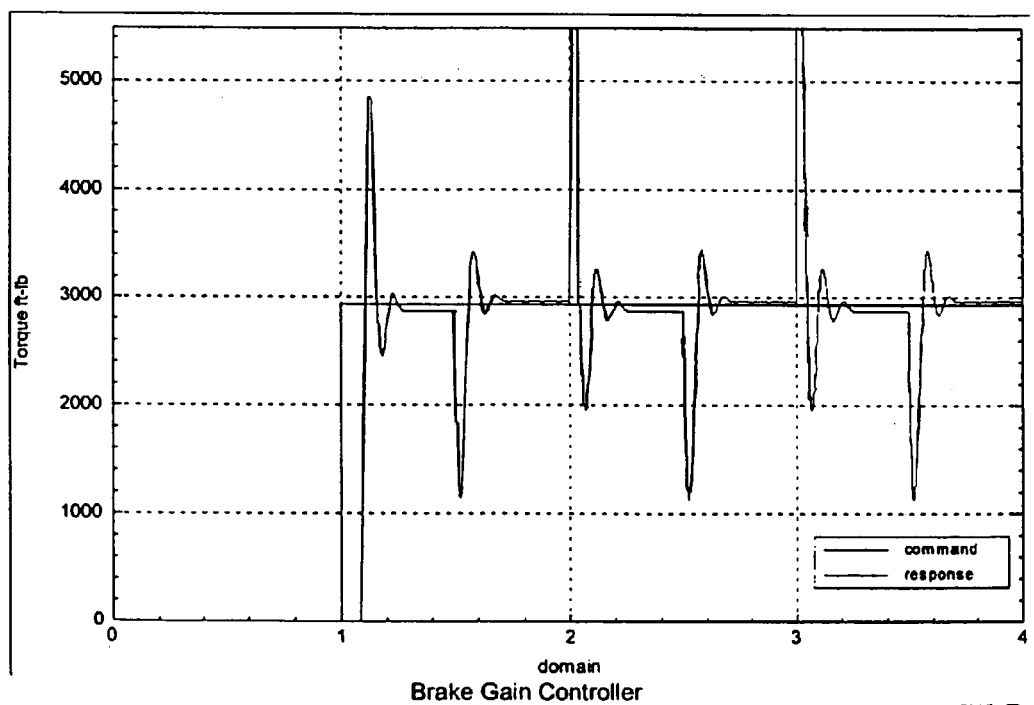
FIG. 12 is a graph of torque versus domain for a step input torque command, step brake gain and brake friction dynamics on for a brake gain-based torque controller in accordance with the present invention.

FIG. 11 is a plot illustrating the operation of the PID torque controller with a step input torque command, a step brake gain, and brake friction dynamics. The plot shown in FIG. 11 is to be compared with the plot shown in FIG. 12 which illustrates the corresponding operation of the brake gain-based torque controller 14 in accordance with the present invention. The response of the PID controller represented in FIG. 11 exhibits a slow recovery to the step input torque commanded (generally labeled as SR). The response of the brake gain-based torque controller 14 rapidly recovers from the step input torque commanded as illustrated in FIG. 12. A slight overshoot, labeled O, occurs at the initial step commanded torque, however, the overshoot is quickly damped out.

FIG. 13 is a plot illustrating the operation of the PID torque controller with a sine input torque command, a step brake gain, and brake friction dynamics. The plot shown in FIG. 13 is to be compared with the plot shown in FIG. 14 which illustrates the corresponding operation of the brake gain-based torque controller 14 in accordance with the present invention. The response of the PID controller represented in FIG. 13 exhibits a slow recovery to the step input torque commanded (generally labeled as SR). The response of the brake gain-based torque controller 14 rapidly recovers from the step input torque commanded as illustrated in FIG. 14.

Although the invention has been shown and described with respect to certain preferred aspects, it is obvious that equivalents and modifications will occur to others skilled in the art upon the reading and understanding of the specification. For example, the invention has been described in relation to a brake-by-wire system wherein the depression of the pedal is converted to an electrical signal. It should be understood by those skilled in the art that in a more conventional braking system, pedal depression controls brake pressure via a master cylinder.

The relationship between brake torque and pressure is modeled here as non-dynamic and linear. The fidelity of the brake gain-based torque controller 14 may be improved by using a state estimator, such as a Kalman filter, to better model the brake characteristics. Brake fill, return spring strength, dynamic brake friction, and actuator response could all be added to the model to improve the brake friction estimates, i.e., the computed brake gain or the computed inverse brake gain. The noise characteristics of the measured signals could be added to the model to replace the low pass filters. The brake gain-based torque controller 14 presented here uses desired torque, measured torque, and measured pressure as inputs. If brake pressure is not measured, it could also be modeled by the brake gain-based torque controller 14 and used to estimate brake gain/friction as further described below.

As mentioned above, the pressure applied (measured pressure) is a function of the torque desired. In one embodiment, referring to FIG. 15, the brake-gain based torque controller may be designed to select a predetermined pressure value $P_p$ based on a model of the brake actuator. The predetermined pressure values $P_p$ are predetermined based on the desired response characteristics of the brake gain-based torque controller 14.

To reduce computational complexity, the predefined pressure values are contained in a look-up table 48. The look-up table values are chosen by trial and error, much in the same way that the proportional and integral gains of a traditional PI controller are determined. That is, a mathematical model of the aircraft and a landing scenario are used to do an evaluation of a particular set of pressure values. For example, if the simulation shows excessive pressure at a particular aircraft speed, the pressure value is reduced for the corresponding measured torque signal $T_m$.

Structurally, the measured pressure signal $P_m$ provided from the pressure sensor 24 and the link thereto in FIG. 1. is replaced with the look-up table 48 described above. The command torque signal $T_c$ is coupled to an input of the look-up table 48. Based on the command torque signal $T_c$, the look-up table 48 outputs the predetermined pressure values $P_p$ to the input of the gain amplifier 42. Thus, the predetermined pressure values $P_p$ is used in place of the measured pressure signal $P_m$. The remaining structure includes the components as described above with regards to FIG. 1.

Excessive pressure is considered to be when the wheel decelerates too quickly. Excessive pressure may be determined in a brake gain-based torque controller 14 by limiting a computed inverse brake gain $I_k$ to prevent the computed inverse brake gain $I_k$ from changing to fast, for example. Conversely, if braking is slow to respond and efficiency is lost at a particular aircraft speed, the pressure applied for the corresponding computed brake gain is increased. In general, greater pressures are required for higher brake pressure output command signals $P_o$.

The present invention includes all such equivalents and modifications, and is limited only by the scope of the following.

What is claimed is:

1. A brake gain-based torque controller, comprising:
    an input for receiving a command torque indicative of a desired amount of brake torque applied to a wheel of a vehicle;
    an input for receiving a signal indicative of a measured amount of brake torque applied to the wheel,
    an output for providing a brake pressure output command to a brake actuator and a brake assembly which applies a brake pressure to the wheel based on the brake pressure output command, and
    an input for receiving a pressure signal which is indicative of an amount of pressure applied to the wheel by the brake assembly from a pressure sensor operatively coupled to the brake actuator and the brake assembly for measuring the amount of pressure applied to the wheel,
    wherein during normal braking the brake gain-based torque controller adjusts the brake pressure output command provided to the brake actuator and the brake assembly using a computed inverse brake gain based on the signal indicative of a measured amount of brake torque applied to the wheel and a measured pressure signal indicative of an amount of the brake pressure applied by the brake assembly to provide improved brake response during normal braking.

2. The brake gain-based torque controller of claim 1, wherein the signal indicative of the amount of brake torque applied to the wheel Is a measured torque signal Tm.

3. The brake gain-based torque controller of claim 2, wherein the measured torque signal $T_m$ is fed into the brake gain-based torque controller to determined the computed inverse brake gain based on the desired response characteristics of the brake gain-based torque controller.

4. The brake gain-based torque controller of claim 1, further including:
    a gain block which receives as an input the pressure signal and outputs a signal that is scaled to the signal indicative of the amount of brake torque applied to the wheel.

5. The brake gain-based torque controller of claim 4, wherein the measured torque signal $T_m$ is used as an upper limit of a limiter of the brake gain-based torque controller in order to prevent damage to a tire.

6. The brake gain-based torque controller of claim 1, wherein the brake gain-based torque controller limits the brake pressure output command based on the measured torque as a function of the measured torque.

7. The brake gain-based torque controller of claim 6, further including:
    circuitry which limits the brake pressure output command based on the measured torque as a function of the measured torque.

8. The system of claim 1, wherein the vehicle is an automobile.

9. The brake gain-based torque controller of claim 1, wherein the brake gain-based torque controller is configured to limit the brake pressure output command based on the measured amount of brake torque applied to the wheel.

10. The brake gain-based torque controller of claim 1, further including:
    an output for providing the computed inverse brake gain to scale the brake pressure output command, wherein the computed inverse brake gain is a function of the brake torque applied to the wheel resulting from an amount of pressure applied to the wheel by the brake actuator via the brake assembly.

11. The brake gain-based torque controller of claim 1, wherein the brake pressure output command is operative to control a pressure valve included in the brake actuator and the brake assembly.

12. The brake gain-based torque controller of claim 1, wherein the brake pressure output command is operative to control a flow valve included in the brake actuator and the brake assembly.

13. The system of claim 1, wherein the vehicle is an aircraft.

14. The brake gain-based torque controller of claim 1, wherein the pressure sensor is configured for measuring an amount of pressure of a fluid controlled by a flow valve, the amount of pressure being indicative of an amount of brake force applied to the wheel.

15. A brake control system, comprising:
an operator command device;
a brake gain-based torque controller coupled to receive as a first input, a command torque output of the operator command device;
a brake actuator coupled to receive a brake pressure output command from the brake gain-based torque controller;
a brake assembly coupled to a wheel to apply a pressure to the wheel based on an output of the brake actuator coupled thereto;
a torque sensor coupled to the wheel to provide a torque signal to the brake gain-based torque controller indicative of the torque applied by the wheel to a vehicle, to which the wheel is coupled; and
a pressure sensor operatively coupled to the brake actuator and the brake assembly for measuring the amount of pressure applied to the wheel and for providing to the brake gain-based torque controller an input signal indicative of an amount of pressure applied to the wheel by the brake assembly,
wherein during normal braking the torque signal and pressure signal are fed into the brake gain-based torque controller to determine a computed inverse brake gain to calculate the brake pressure output command of the brake gain-based torque controller in order to control the pressure to the wheel to achieve the command torque output that improves brake response during normal braking.

16. The brake gain-based torque controller of claim 15, wherein the brake gain-based torque controller is configured to limit the brake pressure output command based on the measured amount of brake torque applied to the wheel.

* * * * *